United States Patent
Ito et al.

[11] Patent Number: 5,992,754
[45] Date of Patent: Nov. 30, 1999

[54] IC PROTECTIVE DEVICE IN MEMORY CARD OPERATING ELECTRONIC APPARATUS

[75] Inventors: Toshiyasu Ito, Togane; Takeshi Nishimura, Narita; Hiroshi Iwasaki, Yokohama, all of Japan

[73] Assignees: Yamaichi Electronics Co., Ltd., Tokyo; Kabushiki Kaisha Toshiba, Kanagawa-ken, both of Japan

[21] Appl. No.: 08/831,138

[22] Filed: Apr. 1, 1997

[30] Foreign Application Priority Data

Apr. 2, 1996 [JP] Japan .................................. 8-080207

[51] Int. Cl.⁶ ............................... G06K 7/00; G06K 7/06
[52] U.S. Cl. .......................... 235/486; 235/441; 235/492
[58] Field of Search .................................. 235/380, 441, 235/492, 486, 475, 477, 478, 479; 361/818; 439/260, 328, 59, 61, 62

[56] References Cited

U.S. PATENT DOCUMENTS

| | | |
|---|---|---|
| 4,264,917 | 4/1981 | Ugon . |
| 4,916,662 | 4/1990 | Mizuta . |
| 4,943,464 | 7/1990 | Gloton et al. . |
| 4,976,630 | 12/1990 | Schuder et al. ........................... 235/441 |
| 5,091,618 | 2/1992 | Takahashi ................................ 235/441 |
| 5,153,818 | 10/1992 | Mukougawa et al. . |
| 5,272,374 | 12/1993 | Kodai et al. . |
| 5,297,029 | 3/1994 | Nakai et al. . |
| 5,297,148 | 3/1994 | Harari et al. . |
| 5,299,089 | 3/1994 | Lwee . |
| 5,375,037 | 12/1994 | Le Roux . |
| 5,388,084 | 2/1995 | Itoh et al. . |
| 5,469,399 | 11/1995 | Sato et al. . |
| 5,477,421 | 12/1995 | Bethurum ................................. 361/818 |
| 5,508,971 | 4/1996 | Cernea et al. . |
| 5,509,018 | 4/1996 | Niijima et al. . |
| 5,535,328 | 7/1996 | Harari et al. . |
| 5,550,709 | 8/1996 | Iwasaki . |
| 5,563,825 | 10/1996 | Cernea et al. . |
| 5,566,105 | 10/1996 | Tanaka et al. . |
| 5,568,424 | 10/1996 | Cernea et al. . |
| 5,572,466 | 11/1996 | Sukegawa . |
| 5,572,478 | 11/1996 | Sato et al. . |
| 5,574,270 | 11/1996 | Steffen ..................................... 235/441 |
| 5,592,420 | 1/1997 | Cernea et al. . |
| 5,596,532 | 1/1997 | Cernea et al. . |
| 5,602,987 | 2/1997 | Harari et al. . |
| 5,608,673 | 3/1997 | Rhee . |
| 5,621,685 | 4/1997 | Cernea et al. . |
| 5,638,321 | 6/1997 | Lee et al. . |
| 5,663,901 | 9/1997 | Wallace et al. . |
| 5,693,570 | 12/1997 | Cernea et al. . |
| 5,714,742 | 2/1998 | Ieda ........................................ 235/441 |

FOREIGN PATENT DOCUMENTS

| | | |
|---|---|---|
| 0 214 478 | 3/1987 | European Pat. Off. . |
| 4-16396 | 1/1992 | Japan . |
| 8-90969 | 4/1996 | Japan . |

*Primary Examiner*—Thien Minh Le
*Attorney, Agent, or Firm*—Wenderoth, Lind & Ponack, L.L.P.

[57] ABSTRACT

An IC protective in a memory card operating electronic apparatus comprising a plurality contacts arranged in a front and a rear row such that they come in contact with a corresponding plurality of electrode pads arranged in a front and a rear row on a memory card when the memory card is inserted into an electronic apparatus, in order to prevent an electrical charge of a charged part held by an electronic circuit within the electronic apparatus from flowing to an IC within the memory card or IC of an electronic circuit within the electronic apparatus when the contacts in the front and the rear row slide on surfaces of the electrode pads in the front and the rear row at the same time during a process for inserting and withdrawing the memory card into and from the electronic apparatus, wherein a discharge circuit for the charge part is formed in operative connection with the inserting and withdrawing movement of the memory card.

8 Claims, 4 Drawing Sheets

IC PROTECTIVE DEVICE IN MEMORY CARD OPERATING ELECTRONIC APPARATUS

BACKGROUND OF THE INVENTION

1. Field of the Invention

This invention relates to an IC protective device in a memory card operating electronic apparatus in which a memory card is inserted into an electronic apparatus such as a computer, word processor, and the like.

2. Related Art

A memory card 1 is a card for inputting data to an electronic apparatus when inserted therein. The card 1 comprises, as shown in FIGS. 1A and 1B, a card body 2 composed of a planar insulative plate and having an IC 3 as a memory element. As shown in FIG. 2A, the memory card 1 is inserted into a card receiving slot of the electronic apparatus so that electrode pads 4a, 4b of the IC 3, arranged in such a manner to expose themselves on a surface of the memory card 1, are brought into contact with contacts 5a, 5b, arranged within the electronic apparatus, so that the memory card 1 is electrically connected to an electronic circuit (wiring circuit board 7) within the electronic apparatus. By doing so, the IC card 1 renders a new memory function to the electronic apparatus through the IC memory element.

In the memory card 1, it is necessary to effectively arrange a plurality of electrode pads 4a, 4b on the surface of the memory card 1 having a limited area. Therefore, it is necessary for such a memory card 1 that the electrode pads are arranged side by side in a parallel relation not only in a short direction of the card 1 (i.e., perpendicular direction to a direction of insertion of the card 1) but also in a long direction of the card 1(direction of insertion of the card 1).

On the other hand, as shown in FIG. 2A, the contacts 5a, 5b, which are designed to come in contact with the electrode pads 4a, 4b, are also arranged such that contact points 6a, 6b disposed on distal ends of the contacts 5a, 5b are offset in the direction of insertion of the card 1, so that when the card insertion is completed, the contact points 6a, 6b are in contact with the electrode pads 4a in the front row and the electrode pads 4b in the rear row.

In the above memory card operating electronic apparatus, it occurs that, as shown in FIG. 2B, during a process for inserting and withdrawing the memory card 1 to and from the electronic apparatus, the contact points 6b of the contacts 5b in the rear row, which are arranged to contact the electrode pads 4b in the rear row on the IC card 1, are slidingly passed on surfaces of the electrode pads 4a in the front row which the contact points 6a of the contacts 5a in the front row are intended to contact.

That, is, during a process for inserting and withdrawing the memory card 1 to and from the electronic apparatus, it occurs that both the contact points 6a, 6b of the contacts 5a, 5b in the front and rear rows are slidingly passed on the surfaces of the electrode pads 4a in the front row simultaneously. This occurrence brings about the problem of damaging the IC due to the electrical charge, which is stored in the charged part 9 within the electronic circuit while the charged part 9 is in use, incurred to the IC within the electronic apparatus or IC within the memory card 1 formed on the wiring circuit board 7 through the contacts 5a, 5b which are designed to contact the electrode pads 4a in the front row, especially during a process for withdrawing the memory card 1 from the electronic apparatus. The memory card 1 is repeatedly inserted and withdrawn in use. Therefore, each time the memory card 1 is inserted in and withdrawn from the electronic apparatus, the charge stored in the charged part 9 is incurred to the IC. This increases the chances of damaging to the IC.

FIGS. 2A and 2B show a control circuit 8, which is to be contacted with the IC 3 within the memory card 1 through the contacts 5a, 5b and electrode pads 4a, 4b, respectively. This control circuit 8 is a circuit having the functions of providing data held by the IC 3 within the memory card 1 to a data processing circuit within the apparatus or recording the data of the data processing circuit within the apparatus on the IC 3 within the memory card 1.

The present invention has been accomplished in view of the above.

SUMMARY OF THE INVENTION

It is, therefore, an object of the present invention to provide an IC protective device in a memory card operating electronic apparatus, in which an IC contained in an electrical circuit or in the memory card is prevented from being damaged by a hazardous electrical charge, which would, otherwise, be incurred thereto during an inserting or withdrawing operation of the memory card.

Another object of the present invention is to provide a IC protective device in a memory card operating electronic apparatus, in which a malfunctioning due to hazardous electrical charge rarely occurs to the electronic apparatus or an electrical circuit of the memory card.

In order to achieve the above objects, from one aspect of the present invention, there is essentially provided an IC protective device in a memory card operating electronic apparatus comprising a plurality of contacts arranged in a front and a rear row such that they come in contact with a corresponding plurality of electrode pads arranged in a front and a rear row on a memory card when the memory card is inserted into an electronic apparatus, in order to prevent an electrical charge of a charged part held by an electronic circuit within the electronic apparatus from flowing to an IC within the memory card or IC of an electronic circuit within the electronic apparatus when the contacts in the front and the rear row slide on surfaces of the electrode pads in the front and the rear row at the same time during a process for inserting and withdrawing the memory card into and from the electronic apparatus, wherein a discharge circuit for the charged part is formed in operative connection with the inserting and withdrawing movement of the memory card.

From another aspect of the present invention, there is also provided an IC protective device in a memory card operating electronic apparatus in which an IC memory card is inserted into an electronic apparatus in order to input data to the electronic apparatus, wherein a discharge circuit for a charged part held by an electronic circuit within the electronic apparatus is formed by bringing grounding contacts into contact with corresponding grounding electrode pads arranged on the memory card during a process for withdrawing the memory card in order to prevent an electrical charge stored in the charged part from flowing to an IC within the electronic circuit or IC within the memory card when the signal contacts, which are designed to contact the signal electrode pads on the memory card, slide on surfaces of other signal electrode pads which are designed to contact other signal contacts during a process for inserting and withdrawing the memory card into and from the electronic apparatus, and a timing is properly set such that the discharge circuit is closed by bringing the grounding electrode pads and the grounding contacts into contact with each other before the signal contacts come into contact with other signal electrode pads.

The charged part 9 may be an anti-noise condenser which is to be connected, for example, between a power supply line and a grounding line, or an inductance element, transformer, and the like disposed in the electronic circuit.

The above and other objects, characteristic features, and advantages of the present invention will become more apparent to those skilled in the art by the following description of one preferred embodiment of the present invention, as illustrated in the accompanying drawings.

DETAILED DESCRIPTION OF THE PREFERRED EMBODIMENT

Figure 1:
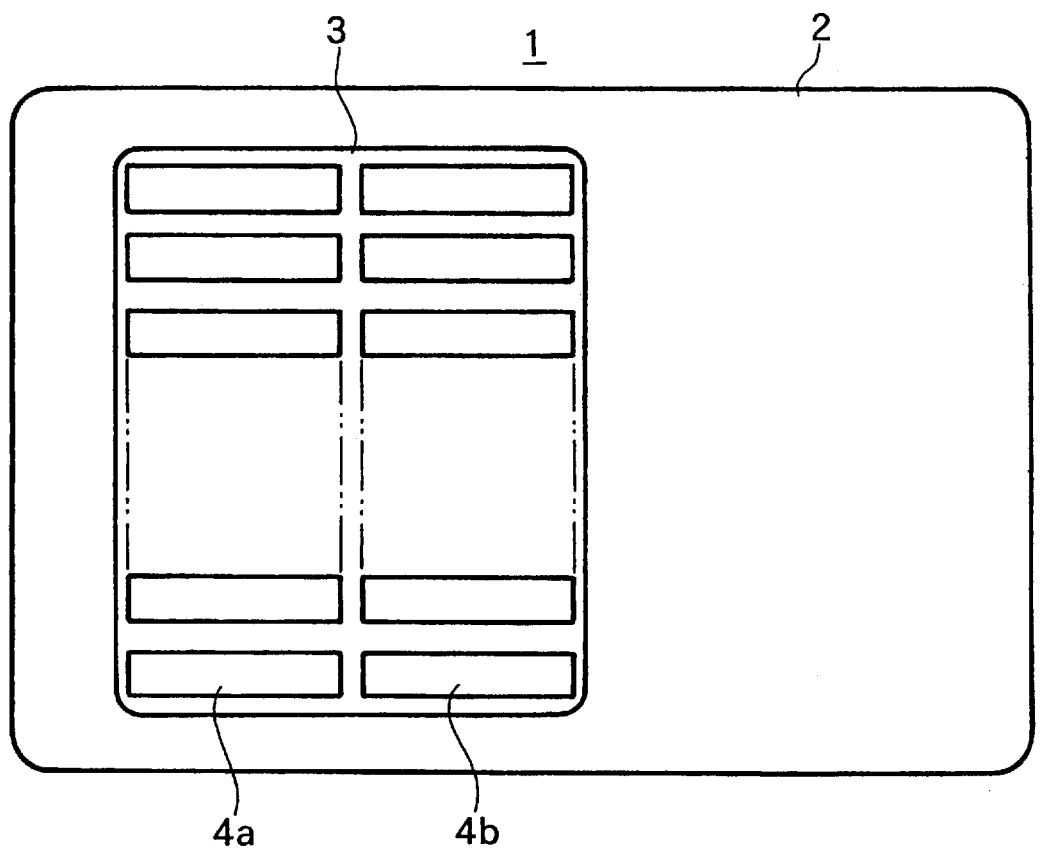
FIG. 1A is a plan view of a memory card.
FIG. 1B is a sectional view of the memory card of FIG. 1A.
Figure 1:
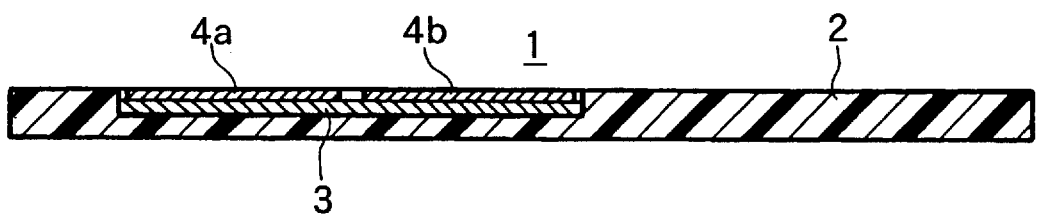
Figure 2:
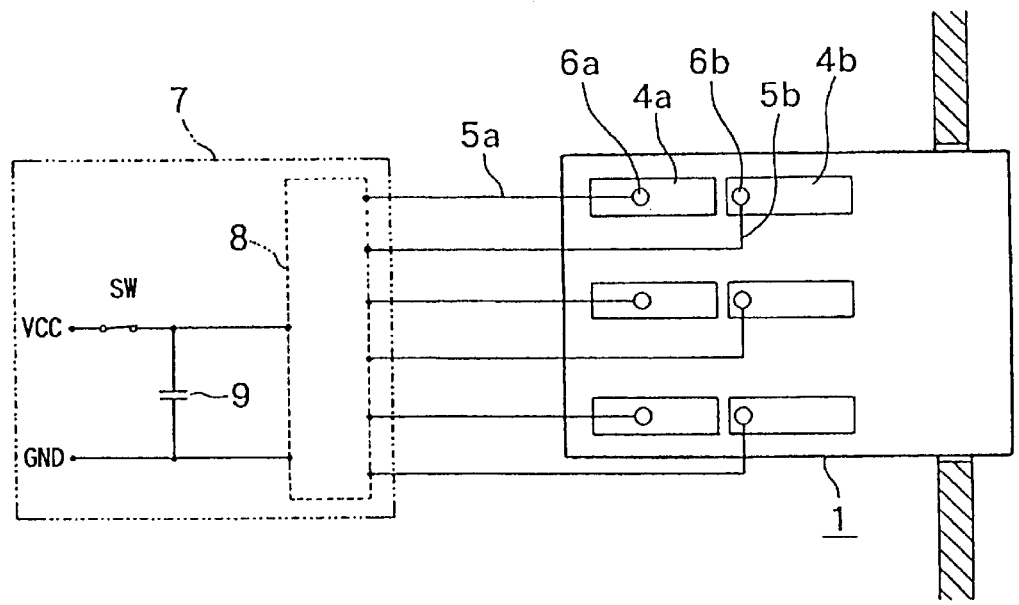
FIG. 2A is a plan view schematically showing a state where the memory card is inserted into an electronic apparatus so as to be connected to an electronic circuit within the electronic apparatus.
FIG. 2B is a plan view schematically showing a state of connection during an inserting or a withdrawing operation of the memory card.
Figure 2:
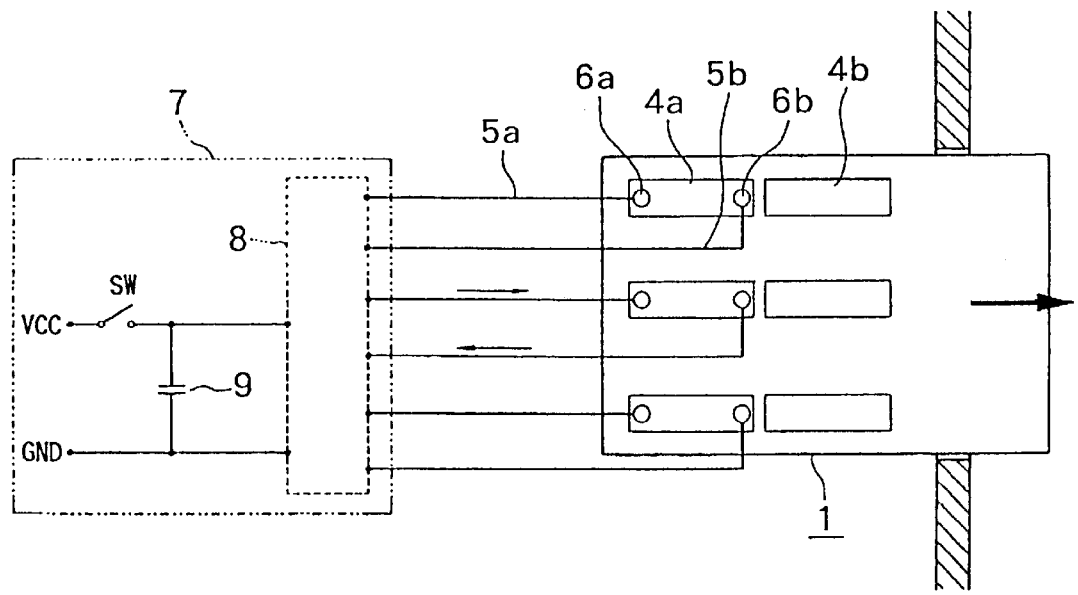

As shown in FIG. 1, a memory card 1 includes a planar and square insulative card body 2 having predetermined specifications, and an IC 3, as a memory element, attached to the card body 2 and having specific data to be provided to the electronic apparatus.

The IC 3, as a memory element, is a semiconductor device of a thin foil called an "IC chip". On a surface of the IC 3, there are arranged a plurality of electrode pads 4a, 4b. This IC 3 is bonded to the surface of the card body 2 through an adhesive agent, with the electrode pads 4a, 4b being exposed to the surface of the card body 2.

For example, a recess having a small depth is formed in the surface of the card body 2. The IC 3 is received in this recess and bonded to a bottom of the recess through an adhesive agent.

When inserted into the electronic apparatus, the memory card 1 gives card-specific data recorded on the IC 3 as a memory element to an electronic circuit of an electronic apparatus 10.

The electrode pads 4a, 4b are arranged side by side in a parallel relationship in a short direction (direction perpendicular to the direction of insertion of the card) of the card 1. The electrode pads denoted by 4a are referred to as the electrode pads in a front row or front row electrode pads. Similarly, those electrode pads denoted by 4b are referred to as the electrode pads in a rear row or rear row electrode pads.

Figure 3:
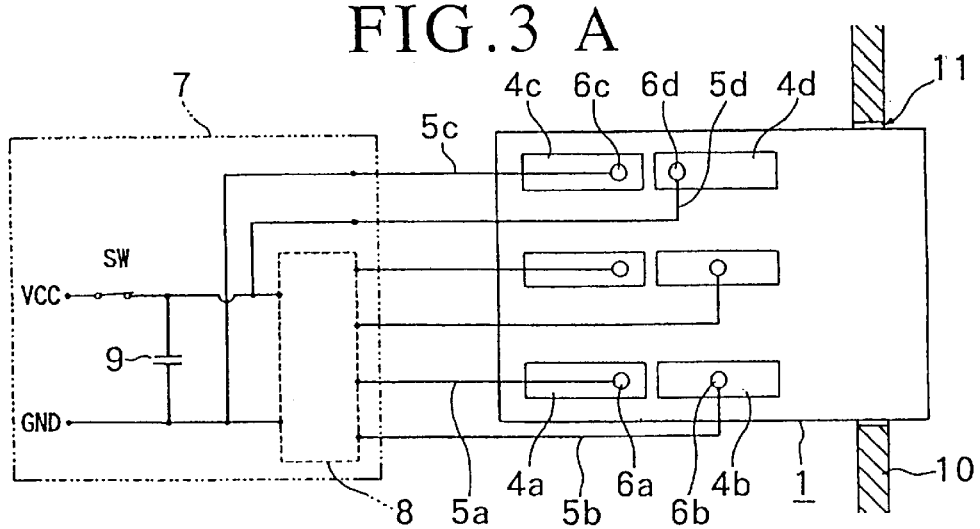
FIG. 3A is a plan view schematically showing a state where the memory card is inserted into the electronic apparatus so as to be connected to the electronic circuit contained within the electronic apparatus.
FIGS. 3B and 3C are plan views schematically showing a state where a discharge circuit is formed during an inserting or a withdrawing operation of the memory card.
Figure 3:
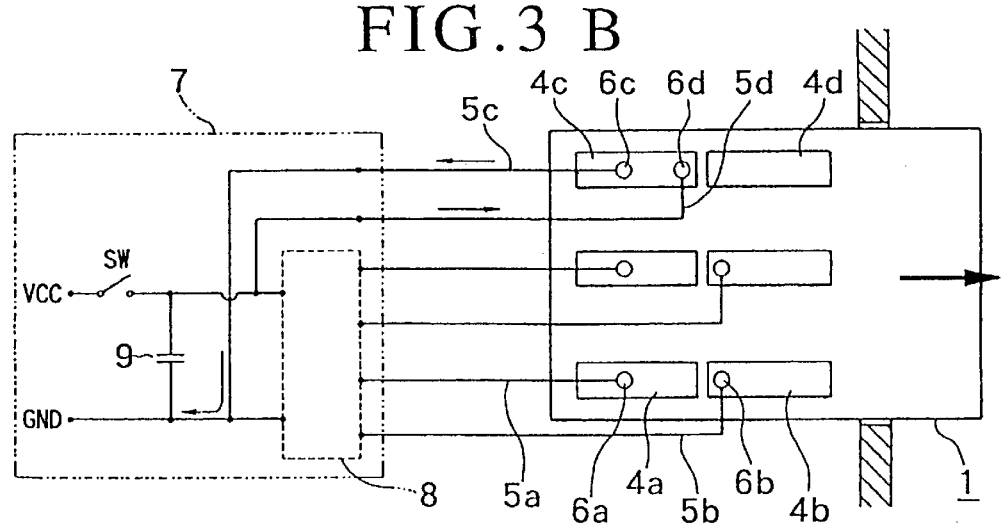
Figure 3:
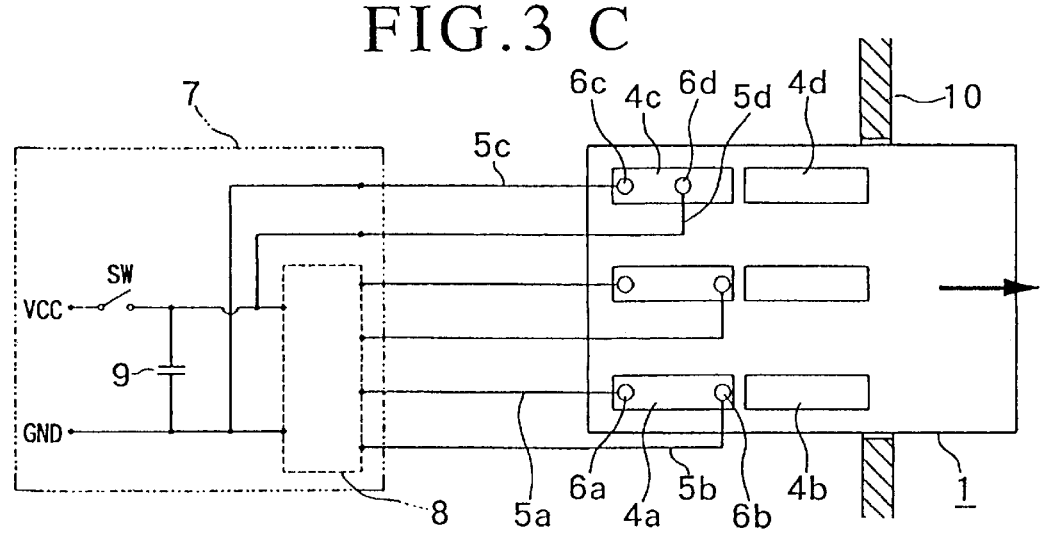
Figure 4:
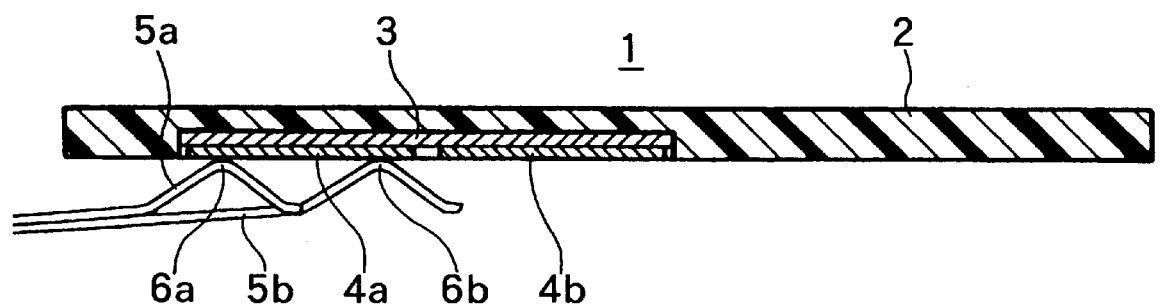
FIG. 4 is a sectional view showing a state where a pair of signal contacts contained within the electronic apparatus are simultaneously short-circuited to signal electrode pads on the memory card.

On the other hand, as shown in FIGS. 3 and 4, contacts 5a, 5b, which are designed to come in contact with the electrode pads 4a, 4b, are also arranged in the electronic apparatus such that contact points 6a, 6b disposed on distal ends of the contacts 5a, 5b are offset in the direction of insertion of the card 1, so that when the card insertion is completed, the contact points 6a, 6b are in contact with the electrode pads 4a in the front row and the electrode pads 4b in the rear row, respectively. Those contact points denoted by 6a are referred to as the contact points in the front row or front row contact points. Similarly, those contact points denoted by 6b are referred to as the contact points in the rear row.

As shown in FIG. 3A, when the memory card 1 is inserted into the electronic apparatus 10 through a card insertion slot 11, the contact points 6a, 6b of the contacts 5a, 5b are brought into contact under pressure with the electronic pads 4a, 4b, respectively, while slidingly passing on the surface of the memory card 1.

When the contacts 5a, 5b come into contact with the electrode pads 4a, 4b, data recorded on the IC 3 are given to a data processing circuit of the electronic apparatus 10, or data from the data processing circuit of the electronic apparatus 10 are allowed to be recorded on the IC 3 of the memory card 3. The memory-specific recorded data are erased by those recorded data.

End portions of the signal contacts 5a, 5b and contacting contacts 5c, 5d as described hereinafter are soldered to a surface of a wiring circuit board 7 and connected to a control circuit 8 formed by the wiring circuit board 7. Then, they are connected to the data processing circuit or writing circuit within the electronic apparatus through the control circuit 8.

The control circuit 8, data processing circuit, and writing circuit are referred to as the electronic circuit in the electronic apparatus.

As previously mentioned, during the process for inserting and withdrawing the memory card 1 to and from the card insertion slot 11 of the electronic apparatus 10, the signal contacts 5a, 5b in the front and rear rows, which are designed to contact the signal electrode pads 4a, 4b in the front and rear rows of the memory card 1, are simultaneously slidingly passed on the surfaces of the front row signal electrode pads 4a. During the sliding movement an electrical charge stored in a charged part 9 held by the electronic circuit within the electronic apparatus flows, for example, to the IC within the control circuit 8 or to the IC 3 within the memory card 1. This flowing of the electrical charge is repeated each time the memory card 1 is inserted and withdrawn, and this results in damage to the IC and malfunctioning of the IC.

As means for solving the above-mentioned problems, there is provided an IC protective device in a memory card operating electronic apparatus, having the following construction. As shown in FIGS. 3A, 3B and 3C, a discharge circuit (GND of 9 to 5d to 6d to 4c to 6c to 5c to 9) for the charged part 9 is formed by bringing the contact points 6c, 6d of the grounding contacts 5c, 5d into contact with the grounding pads 4c on the memory card 1 during the process for inserting and withdrawing to and from the memory card 1. A timing is properly set such that the grounding electrode pads 4c and grounding contacts 5c, 5d are contacted with each other before the signal contacts 5a, 5b come into contact with the front row signal electrode pads 4a so that the discharge circuit is precedently closed.

The charged part 9 is an anti-noise condenser connected in between a power supply line and a grounding line. The grounding electrode pad 4c is a pad located at one end of the front row of the pads 4a group in which the pads are arranged side by side in parallel relation in a short direction of the memory card 1.

As shown in FIG. 3A, when the memory card 1 is completely inserted, the contact points 5a, 5b of the front and rear row signal contacts 5a, 5b come into contact with the surfaces of the front and rear row electrode pads 4a, 4b while slidingly passing on the card surface, thereby to contact the IC 3 within the card 1 and the control circuit 8 and data processing circuit within the electronic apparatus. The contact points 6c of the grounding contacts 5c in the front row are in contact with the grounding electrode pads 4c in the front row, whereas the contact points 6d of the grounding contacts 5d in the rear row are in contact with the electrode pads 4d in the rear row, thereby opening the discharge circuit.

As shown in FIG. 3B, during a process for inserting and withdrawing the memory card 1, the contacts 5a through 5d slidingly pass on the card surface, and in the meantime, the grounding contacts 5c, 5d simultaneously come into contact with the grounding electrode pads 4c in the front row to thereby form the discharge circuit.

A timing is properly set such that this discharge circuit is formed before the signal contacts 5a, 5b simultaneously come into contact with the signal electrode pads 4a in the front row.

For example, by offsetting the location of the grounding contacts 5d in the rear row forwardly with respect to the location of the contact points 5b of other signal contacts 5b in the rear row, it becomes possible for the contact points 6c, 6d to contact the grounding pads 4c in the front row before the contact points 6a, 6b of other signal contacts 5a, 5b come into contact with the signal electrode pads 4a, thus precedently forming the discharge circuit.

In other words, as shown in FIG. 3C, after the grounding contacts 5c, 5d come into contact with the grounding electrode pads 4c to form the discharge circuit and the electrical charge stored in the charged part 9 is released, the signal contacts 5a, 5b come into contact with the signal electrode pad 4a.

As a consequence, the present invention can appropriately obviate the problem that the electrical charge stored in the charged part 9 flows to the IC of the electronic circuit within the electronic apparatus such as the control circuit 8, and the like, or the IC 3 within the memory card 1, thus resulting in damage or malfunctioning thereto.

In FIG. 3, SW denotes a power switch. As shown in FIG. 3, when the memory card 1 is in its completely inserted position, the power switch SW is closed in operative connection with this card insertion operation, and as a consequence, the supply of power to the card and control circuit 8 is started.

Also, as shown in FIG. 3, almost simultaneous with the start of the withdrawing operation of the card 1, the power switch SW is opened and as a consequence, the supply of power to the control circuit 8 and card 1 is cut off. However, nevertheless the power switch SW is opened, the electrical charge stored in the charged part 9 still remains and this electrical charge is released through the grounding contacts 5c, 5d and electrode pads 4c. Thus, it is effectively prevented that the remaining electrical charge is incurred to the IC within the electronic circuit within the electronic apparatus such as the control circuit 8, and the like, or the IC within the card through the electrode pad of the card.

According to the present invention, there is provided an IC protective device in a memory card operating electronic apparatus comprising a plurality of contacts arranged in a front and a rear row such that they come in contact with a corresponding plurality of electrode pads arranged in a front and a rear row on a memory card, when the memory card is inserted into an electronic apparatus, in order to prevent an electrical charge of a charged part held by an electronic circuit within the electronic apparatus from flowing to an IC within the memory card or IC of an electronic circuit within the electronic apparatus when the contacts in the front and the rear row slide on surfaces of the electrode pads in the front and the rear row at the same time during a process for inserting and withdrawing the memory card into and from the electronic apparatus, wherein a discharge circuit for the charged part is formed in operative connection with the inserting and withdrawing movement of the memory card.

Further, according to the present invention, there is provided an IC protective device in a memory card operating electronic apparatus in which an IC memory card is inserted into an electronic apparatus in order to input data to the electronic apparatus, wherein a discharge circuit for a charged part held by an electronic circuit within the electronic apparatus is formed by bringing grounding contacts into contact with corresponding grounding electrode pads arranged on the memory card during a process for withdrawing the memory card in order to prevent an electrical charge stored in the charged part from flowing to an IC within the electronic circuit or IC within the memory card when the signal contacts, which are designed to contact the signal electrode pads on the memory card, slide on surfaces of other signal electrode pads which are designed to contact other signal contacts during a process for inserting and withdrawing the memory card into and from the electronic apparatus, and a timing is properly set such that the discharge circuit is closed by bringing the grounding electrode pads and the grounding contacts into contact with each other before the signal contacts come into contact with other signal electrode pads.

Accordingly, the problem attributable to the conventional memory card in which the electrode pads are arranged side by side in a parallel relationship in the direction of insertion of the memory card, that is, the problems of damaging the ICs and of malfunctioning the same due to the electrical charge stored in the charged part being incurred to the IC within the electronic circuit or IC within the memory card because the contact points of the signal contacts in the front and rear rows simultaneously come into contact with the signal electrode pads in the front row during the card insertion/withdrawal operation, can assuredly be obviated by the discharge circuit which is formed on the memory card during the card withdrawal operation. Consequently, the advantages of the space-saving parallel arrangement of the electrode pads are effectively maintained and at the same time, an intended operation by means of the memory card is fully ensured.

Although this invention has been described in its preferred form with a certain degree of particularity, it should be understood that the present disclosure of the preferred form has been made only by way of example and that numerous changes in the details of construction and arrangement of parts may be resorted to without departing from the spirit and the scope of the present invention.

What is claimed is:

1. An IC protective device for use in an electronic apparatus capable of receiving a memory card, the memory card comprising pairs of electrode pads arranged such that one of the electrode pads from each of the pairs is located in a front row and the other electrode pad from each of the pairs is located in a rear row, and wherein one pair of the pairs of electrode pads comprises a front grounding pad (4c) and a rear grounding pad (4d) and wherein another pair of the pairs of electrode pads comprises a front signal electrode pad (4a) and a rear signal electrode pad (4b), said device comprising:

pairs of contacts arranged such that, when the memory card is fully inserted in the electronic apparatus, one pair of said pairs of contacts comprising a front grounding contact (5c) and a rear grounding contact (5d) are in contact with the front grounding pad (4c) and the rear grounding pad (4d), respectively, and another pair of said pairs of contacts comprising a front signal contact (5a) and a rear signal contact (5b) are in contact with the front signal electrode pad (4a) and the rear signal electrode pad (4b), respectively;

wherein said pairs of contacts are arranged such that, during an extraction and insertion of the memory card from and to the electronic apparatus, said front grounding contact (5c) and said rear grounding contact (5d) simultaneously come in contact with the front grounding pad (4c) to form a discharge circuit prior to said front signal contact (5a) and said rear signal contact (5b) simultaneously coming in contact with the front signal electrode pad (4a); and wherein said discharge circuit prevents an electrical charge held by a charged part of an electronic circuit of the electronic apparatus from flowing to an IC located in the memory card or the electronic circuit.

2. An IC protective device for use in an electronic apparatus capable of receiving a memory card, the memory card comprising a pair of grounding pads (4c & 4d) and a pair of signal electrode pads (4a & 4b), said device comprising:

a pair of grounding contacts (5c & 5d) and a pair of signal contacts (5a & 5b) correspondingly provided for contacting the pair of grounding pads (4c & 4d) and the pair of signal electrode pads (4a & 4b), respectively, when the memory card is fully inserted in the electronic apparatus; and a discharge circuit formed by arranging said pair of grounding contacts (5c & 5d) and said pair of signal contacts (5a & 5b) such that, during an extraction and insertion of the memory card from and to the electronic apparatus, each of said pair of grounding contacts (5c & 5d) simultaneously come in contact with one of the pair of grounding pads (4c & 4d) prior to one of said pair of signal contacts (5a & 5b) coming into contact with a non-corresponding one of the pair of signal electrode pads (4a & 4b);

wherein said discharge circuit prevents an electrical charge held by a charged part of an electronic circuit of the electronic apparatus from flowing to an IC located in the memory card or the electronic circuit.

3. A device as claimed in claim 1, wherein the charged part is an anti-noise condenser connected between a power supply line and a grounding line.

4. A device as claimed in claim 1, wherein the charged part is an inductance element disposed within the electronic circuit.

5. A device as claimed in claim 1, wherein the charged part is a transformer disposed within the electronic apparatus.

6. A device as claimed in claim 2, wherein the charged part is an anti-noise condenser connected between a power supply line and a grounding line.

7. A device as claimed in claim 2, wherein the charged part is an inductance element disposed within the electronic circuit.

8. A device as claimed in claim 2, wherein the charged part is a transformer disposed within the electronic apparatus.

* * * * *